(12) United States Patent
Zhang et al.

(10) Patent No.: US 9,598,907 B2
(45) Date of Patent: Mar. 21, 2017

(54) MODIFICATION OF DIAMOND FEEDS FOR IMPROVING POLYCRYSTALLINE DIAMOND CUTTER

(71) Applicant: DIAMOND INNOVATIONS, INC., Worthington, OH (US)

(72) Inventors: Kai Zhang, Westerville, OH (US); Frank Gao, Columbus, OH (US); Gary Flood, Canal Winchester, OH (US)

(73) Assignee: DIAMOND INNOVATIONS INC., Worthington, OH (US)

( * ) Notice: Subject to any disclaimer, the term of this patent is extended or adjusted under 35 U.S.C. 154(b) by 0 days.

(21) Appl. No.: 14/194,086

(22) Filed: Feb. 28, 2014

(65) Prior Publication Data
US 2015/0247365 A1 Sep. 3, 2015

(51) Int. Cl.
| | |
|---|---|
| B24D 3/00 | (2006.01) |
| B24D 11/00 | (2006.01) |
| B24D 18/00 | (2006.01) |
| C09K 3/14 | (2006.01) |
| B24D 3/02 | (2006.01) |
| E21B 10/46 | (2006.01) |
| C04B 35/5831 | (2006.01) |
| C04B 35/626 | (2006.01) |
| C04B 35/645 | (2006.01) |
| C04B 37/02 | (2006.01) |
| C22C 26/00 | (2006.01) |
| B01J 3/06 | (2006.01) |

(Continued)

(52) U.S. Cl.
CPC .............. *E21B 10/46* (2013.01); *B01J 3/062* (2013.01); *C01B 31/065* (2013.01); *C04B 35/528* (2013.01); *C04B 35/5831* (2013.01); *C04B 35/6265* (2013.01); *C04B 35/6268* (2013.01); *C04B 35/62675* (2013.01); *C04B 35/645* (2013.01); *C04B 37/026* (2013.01); *C22C 26/00* (2013.01); *B01J 2203/062* (2013.01); *B01J 2203/0655* (2013.01); *B01J 2203/0685* (2013.01); *B22F 2999/00* (2013.01); *C04B 2235/427* (2013.01); *C04B 2235/6582* (2013.01); *C04B 2237/10* (2013.01); *C04B 2237/361* (2013.01); *C04B 2237/363* (2013.01); *C04B 2237/401* (2013.01); *C22C 2204/00* (2013.01)

(58) Field of Classification Search
USPC ................................... 51/297, 293, 307, 309
See application file for complete search history.

(56) References Cited

U.S. PATENT DOCUMENTS

| | | | |
|---|---|---|---|
| 4,638,552 A | 1/1987 | Shimbo et al. | |
| 5,035,771 A * | 7/1991 | Borse ..................... | C04B 41/53 216/75 |

(Continued)

FOREIGN PATENT DOCUMENTS

WO 0146493 A1 6/2001

*Primary Examiner* — James McDonough
(74) *Attorney, Agent, or Firm* — Corinne R. Gorski

(57) ABSTRACT

A superabrasive compact and a method of making the superabrasive compact are disclosed. A superabrasive compact may comprise a superabrasive volume and a substrate. The substrate may be attached to the superabrasive volume via an interface. The superabrasive volume may be formed by a plurality of polycrystalline superabrasive particles. The superabrasive particles may have nano or sub-micron scale surface texture.

16 Claims, 4 Drawing Sheets

(51) Int. Cl.
　　　*C04B 35/528*　　　(2006.01)
　　　*C01B 31/06*　　　(2006.01)

(56) References Cited

U.S. PATENT DOCUMENTS

| | | | |
|---|---|---|---|
| 5,653,300 | A | 8/1997 | Lund et al. |
| 6,080,529 | A | 6/2000 | Ye |
| 6,319,460 | B1 | 11/2001 | Fang |
| 7,745,352 | B2 | 6/2010 | Mallick |
| 2005/0189443 | A1* | 9/2005 | Taylor ................. B05B 1/00 239/591 |
| 2008/0206576 | A1* | 8/2008 | Qian .................. B24D 3/10 428/446 |
| 2010/0064594 | A1 | 3/2010 | Pakalapati et al. |
| 2011/0052803 | A1 | 3/2011 | Bao |
| 2011/0171414 | A1* | 7/2011 | Sreshta ................ C22C 26/00 428/64.1 |
| 2011/0252712 | A1 | 10/2011 | Chakraborty |
| 2013/0067826 | A1 | 3/2013 | Vaughn |

\* cited by examiner

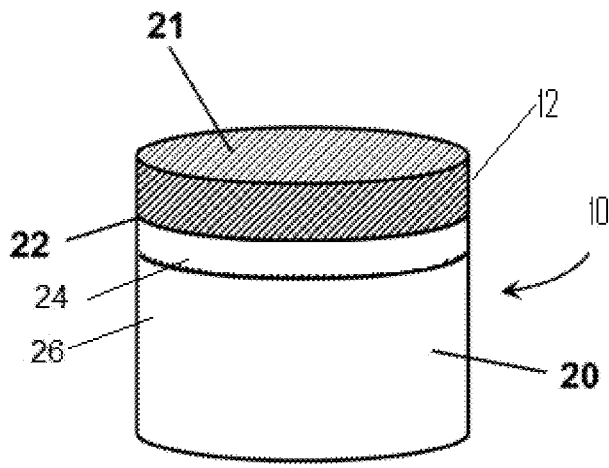

FIG. 1 treating a plurality of diamond particles in a pre-determined temperature at a pre-set atmosphere in such that diamond particles form nano-scale surface texture; — 22 providing a substrate attached to a superabrasive volume formed by the plurality of treated diamond particles; — 24 subjecting the substrate and the superabrasive volume to conditions of elevated temperature and pressure suitable for producing the polycrystalline superabrasive compact. — 26

MODIFICATION OF DIAMOND FEEDS FOR IMPROVING POLYCRYSTALLINE DIAMOND CUTTER

TECHNICAL FIELD AND INDUSTRIAL APPLICABILITY

The present invention relates generally to superabrasive materials and a method of making superabrasive materials, and more particularly, to polycrystalline diamond compacts (PDC) made from modified diamond feeds.

SUMMARY

In one embodiment, a superabrasive compact may comprise a plurality of polycrystalline superabrasive particles having nano or sub-micron scale surface texture; a substrate attached to a superabrasive volume formed by the polycrystalline superabrasive particles via an interface.

In another embodiment, a method of making a superabrasive compact may comprise steps of treating a plurality of diamond particles in a pre-determined temperature at a pre-set atmosphere in such that diamond particles form nano-scale or sub-micron surface texture; providing a substrate attached to a superabrasive volume formed by the plurality of treated diamond particles; and subjecting the substrate and the superabrasive volume to conditions of elevated temperature and pressure suitable for producing the polycrystalline superabrasive compact.

In yet another embodiment, a superabrasive compact may comprise a plurality of polycrystalline superabrasive particles having nano-scale or sub-micron surface texture, wherein the surface texture comprises at least of one of peaks, valleys, channels, concave indentations and half-ellipsoids.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

FIG. 1 is schematic perspective view of a cylindrical shape polycrystalline compact produced in a high pressure high temperature (HPHT) process according to an embodiment;

FIG. 2 is a flow chart illustrating a method of manufacturing polycrystalline compact according to an embodiment;

DETAILED DESCRIPTION

Figure 3:
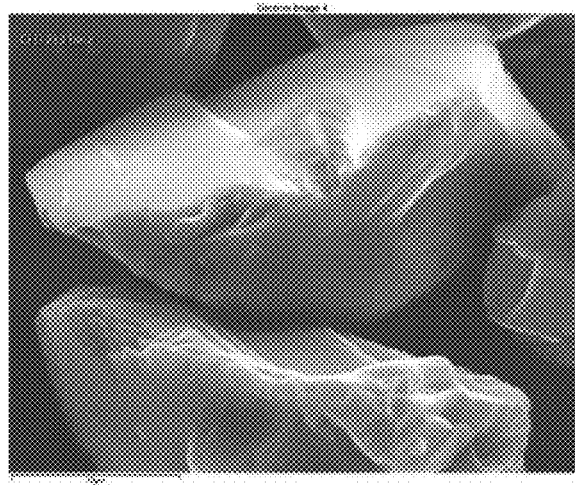
FIG. 3 is a plain view of diamond particles before treatment according to an embodiment.
Figure 4:
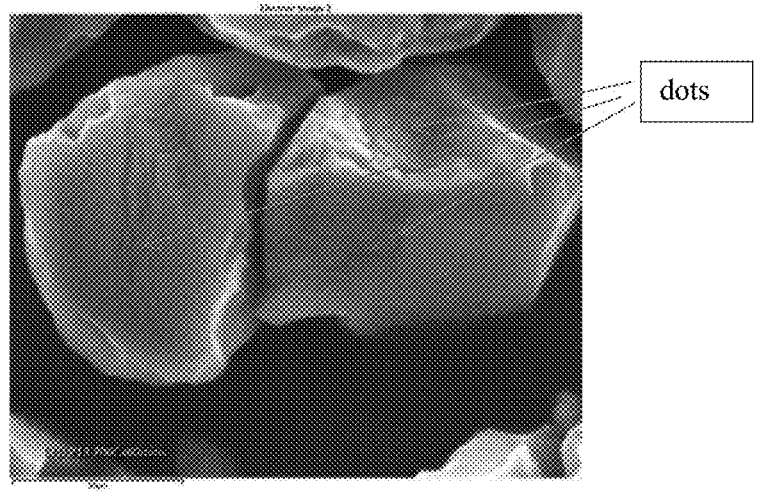
FIG. 4 is a plain view of diamond particles after heat treatment with a flowing air at 700° C. for about 60 minutes illustrating a plurality of nano-scale textured dots according to an embodiment.
Figure 5:
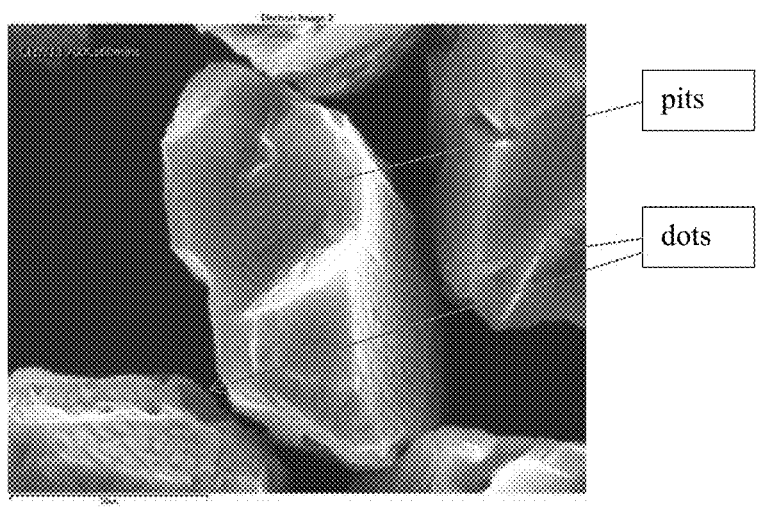
FIG. 5 is a plain view of diamond particles after heat treatment with a flowing air at 700° C. for about 60 minutes illustrating a plurality of nano-scale textured dots and pits according to another embodiment.
Figure 6:
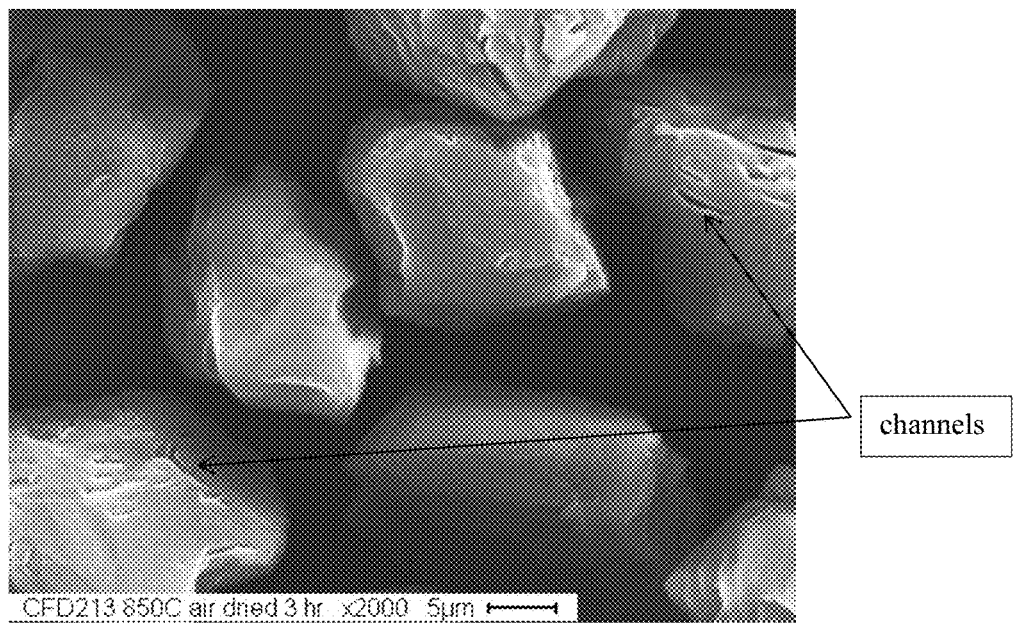
FIG. 6 is a plain view of diamond particles after heat treatment with static air at about 850° C. for about 180 minutes illustrating a plurality of micron-scale and nano-scale valleys and channels according to another embodiment.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%.

As used herein, the term "superabrasive particles" may refer to ultra-hard particles or superabrasive particles having a Knoop hardness of 3500 KHN or greater. The superabrasive particles may include diamond and cubic boron nitride, for example. The term "abrasive", as used herein, refers to any material used to wear away softer materials.

The term "particle" or "particles", as used herein, refers to a discrete body or bodies. A particle is also considered a crystal or a grain.

The term "superabrasive compact", as used herein, refers to a sintered product made using super abrasive particles, such as diamond feed or cubic boron nitride particles. The compact may include a support, such as a tungsten carbide support, or may not include a support. The "superabrasive compact" is a broad term, which may include cutting element, cutters, or polycrystalline cubic boron nitride insert.

The term "cutting element", as used herein, means and includes any element of an earth-boring tool that is used to cut or otherwise disintegrate formation material when the earth-boring tool is used to form or enlarge a bore in the formation.

The term "earth-boring tool", as used herein, means and includes any tool used to remove formation material and form a bore (e.g., a wellbore) through the formation by way of removing the formation material. Earth-boring tools include, for example, rotary drill bits (e.g., fixed-compact or "drag" bits and roller cone or "rock" bits), hybrid bits including both fixed compacts and roller elements, coring bits, percussion bits, bi-center bits, reamers (including expandable reamers and fixed-wing reamers), and other so-called "hole-opening" tools.

The term "feed" or "diamond feed", as used herein, refers to any type of diamond particles, or diamond powder, used as a starting material in further synthesis of PDC compacts.

The term "polycrystalline diamond", as used herein, refers to a plurality of randomly oriented monocrystalline diamond particles, which may represent a body or a particle consisting of a large number of smaller monocrystalline diamond particles of any sizes. Polycrystalline diamond particles usually do not have cleavage planes.

The term "superabrasive", as used herein, refers to an abrasive possessing superior hardness and abrasion resistance. Diamond and cubic boron nitride are examples of superabrasives and have Knoop indentation hardness values of over 3500.

The terms "diamond particle" or "particles" or "diamond powder", which is a plurality of a large number of single crystal or polycrystalline diamond particles, are used synonymously in the instant application and have the same meaning as "particle" defined above.

Polycrystalline diamond compact (or "PDC", as used hereinafter) may represent a volume of crystalline diamond grains with embedded foreign material filling the inter-grain space. In one particular case, a compact comprises crystalline diamond grains, bound to each other by strong diamond-to-diamond bonds and forming a rigid polycrystalline diamond body, and the inter-grain regions, disposed between the bounded grains and filled in one part with a catalyst material (e.g. cobalt or its alloys), which was used to promote diamond bonding during fabrication, and in other part filled with other materials which may remain after the sintering of diamond compact. Suitable metal solvent catalysts may include the iron group transitional metal in Group VIII of the Periodic table.

In another particular case, a polycrystalline diamond composite compact comprises a plurality of crystalline diamond grains, which are not bound to each other, but instead are bound together by foreign bonding materials such as borides, nitrides, carbides, and others, e.g. by silicon carbide bonded diamond material.

Polycrystalline diamond compacts (or PDC compacts) may be fabricated in different ways and the examples discussed herein do not limit a variety of different types of diamond composites and PDC compacts which may be produced according to an embodiment. In one particular example, polycrystalline compacts are formed by placing a mixture of diamond powder with a suitable solvent catalyst material (e.g. cobalt powder) on the top of WC-Co substrate, the assembly is then subjected to conditions of HPHT process, where the solvent catalyst promotes desired intercrystalline diamond-to-diamond bonding resulted in the formation of a rigid polycrystalline diamond body and, also, provides a binding between polycrystalline diamond body and WC-Co substrate.

In another particular example, a polycrystalline diamond compact is formed by placing diamond powder without a catalyst material on the top of substrate containing a catalyst material (e.g. WC-Co substrate). In this example, necessary cobalt catalyst material is supplied from the substrate and melted cobalt is swept through the diamond powder during the HPHT process. In still another example, a hard polycrystalline diamond composite compact is fabricated by forming a mixture of diamond powder with silicon powder and the mixture is subjected to HPHT process, thus forming a dense polycrystalline compact where diamond particles are bound together by newly formed silicon carbide material.

The presence of catalyst materials inside the polycrystalline diamond body promotes the degradation of the cutting edge of the compact during the cutting process, especially if the edge temperature reaches a high enough critical value. It is theorized that the cobalt driven degradation may be caused by the large difference in coefficient of thermal expansion between diamond and catalyst (e.g. cobalt metal), and also by the catalytic effect of cobalt on diamond graphitization. Removal of catalyst from the polycrystalline diamond body of PDC compact, for example, by chemical leaching in acids, leaves an interconnected network of pores and a residual catalyst (up to about 10 vol %) trapped inside the polycrystalline diamond body. It has been demonstrated that depletion of cobalt from the polycrystalline diamond body of the PDC compact significantly improves a compact's abrasion resistance. Thus, it is theorized that a thicker cobalt depleted layer near the cutting edge, such as more than about 100 μm provides better abrasion resistance of the PDC compact than a thinner cobalt depleted layer, such as less than about 100 μm.

A superabrasive compact 10 in accordance with a current embodiment is shown in FIG. 1. Superabrasive compact 10 may be inserted into a downhole of a suitable tool, such as a drill bit, for example. One example of the superabrasive compact 10 may include a superabrasive volume 12 having a top surface 21. The superabrasive compact may comprise a plurality of polycrystalline superabrasive particles. The plurality of polycrystalline superabrasive particles may have nano-scale or sub-micron surface texture. The superabrasive particle may comprise at least one of diamond, cubic boron nitride, diamond composite materials, such as silicon carbide bonded diamond composite materials. The surface texture may be irregular fluctuant, for example. The surface texture may comprise at least one of peaks, valleys, concave indentations, pitting, or half-ellipsoids, for example. The superabrasive particles may comprise the surface texture having at least a pattern comprising one of dots, bumps, blisters, or fish scales.

In one embodiment, the superabrasive compact 10 may be a standalone compact without a substrate. In another embodiment, the superabrasive compact 10 may include a substrate 20 attached to the superabrasive volume 12 formed by polycrystalline superabrasive particles. The substrate 20 may be metal carbide, attached to the superabrasive volume 12 via an interface 22 separating the superabrasive volume 12 and the substrate 20. The interface 22 may have an uneven interface. Substrate 20 may be made from cemented cobalt tungsten carbide, while the superabrasive volume 12 may be formed from a polycrystalline ultra-hard material, such as polycrystalline diamond, polycrystalline cubic boron nitride ("PCBN"), tungsten carbide mixed with diamond crystals (impregnated segments), or diamond crystals bonded by a foreign material.

Still in FIG. 1, the substrate 20 may include at least two layers with a first layer 24 and a second layer 26. The first layer 24 may be closer to the interface 22 and may be sandwiched between the superabrasive volume 12 and the second layer 20. The first layer 24 may have an amount of catalyst more than the second layer 20. The catalyst may include an iron group transitional metal, such as cobalt, nickel, or iron, for example. The more concentration of the catalyst in the first layer 24 may help bonding between the first layer 24 with the superabrasive volume 12.

The superabrasive compact 10 may be fabricated according to processes known to persons having ordinary skill in the art. Methods for making diamond compacts and composite compacts are more fully described in U.S. Pat. Nos. 3,141,746; 3,745,623; 3,609,818; 3,850,591; 4,394,170; 4,403,015; 4,794,326; and 4,954,139. The two layers 24 and 26 of tungsten carbide may be from different grades of tungsten carbide and formed a polycrystalline diamond with diamond feeds under high pressure and high temperature.

The compact 10 may be referred to as a polycrystalline diamond compact ("PDC") when polycrystalline diamond is used to form the polycrystalline volume 12. PDC compacts are known for their toughness and durability, which allow them to be an effective cutting insert in demanding applications. Although one type of superabrasive compact 10 has been described, other types of superabrasive compacts 10 may be utilized. For example, in one embodiment, superabrasive compact 10 may have a chamfer (not shown) around an outer peripheral of the top surface 21. The chamfer may have a vertical height of about 0.5 mm or 1 mm and an angle of about 45° degrees, for example, which may provide a particularly strong and fracture resistant tool component. In another embodiment, the superabrasive compact 10 may be a subject of procedure depleting catalyst metal (e.g. cobalt) near the cutting surface of the compact, for example, by chemical leaching of cobalt in acidic solutions.

As shown in FIG. 2, a method 20 of making a superabrasive compact may comprise the steps of treating a plurality of diamond particles in a pre-determined temperature, such as from about 550° C. to about 700° C., at a pre-set atmosphere, such as flowing air or flowing oxygen, such that diamond particles form nano-scale or sub-micron surface texture in a step 22, or such as from about 750° C. to about 900° C. in a static or non-flowing air atmosphere, such that diamond particles form nano-scale or sub-micron scale surface channels or valleys; providing a substrate, such as cemented tungsten carbide, attached to a superabrasive volume formed by the plurality of treated diamond particles in a step 24; subjecting the substrate and the superabrasive volume to conditions of elevated temperature and pressure, such as from about 1400° C. to about 2500° C. and about 10 to about 80 Kbar, respectively, suitable for producing the polycrystalline superabrasive compact in a step 26.

The method 20 of a step of processing the plurality of diamond particles via hydrogen firing. Deep cleaning of diamond particles occurs through heat treatment with flowing air or oxygen at a temperature range from about 550° C. to about 700° C., or through heat treatment with static air at a temperature range from about 750° C. to about 900° C. Diamond particles may be as milled micron diamonds or as-grown micron diamonds (AGM). The cleaning time may vary from about 0.5 hour to about 3 hours, for example, depending on the amount of the diamond particles. The diamond particles subjected to the deep cleaning may exhibit unique surface textures in nano or sub-micron scale texture. The surface texture may be due to minor reaction between diamond and oxygen. The unique surface texture may change the diamond surface energy and make diamond very active during HPHT sintering. It may also change the local manner in which the diamond particles slide over one another to form a consolidated packed structure during the compaction stage of the HPHT sintering. In addition, in particular with the static air treatment, some of the diamond particles are reduced slightly in size, and sharp corners are slightly rounded. This may alter the particle size distribution and crystal shapes sufficiently to provide a lower friction powder during compaction, enabling a greater percentage of crystals to become in intimate contact during the compaction stage of the HPHT. Upon sintering, a greater degree of diamond bonding is attained.

Extra cleaned surface on the diamond particles may help diamond to diamond bonding because the diamond surfaces are reduced with crystal lattice defects. Crystal lattice defects on the surface, such as as-grown inclusions, impurities and dislocations may be removed during deep cleaning. Nano-scale diamond surface texture may help activate reaction between diamond and catalysts during HPHT. Nano-scale diamond surface texture may provide a potentially beneficial condition for lowering pressure and/or temperature at HPHT sintering polycrystalline diamond compacts. Higher surface area of diamond particles due to the modified surface texture may help disperse catalyst clusters spatially such that it may mitigate aggregation of catalyst clusters during catalyst sweeping under HPHT sintering. Higher surface area of diamond particles may help reduce catalyst contents trapped in the grain boundaries by forming interstitial atoms or clusters during diamond growth, which in turn, may help keep impact toughness high while maintaining high abrasion resistance.

The heat treatment in step 22 may be added into any step during pretreatment step. In one embodiment, the heat treatment step may be done before hydrogen firing. In another embodiment, the heat treatment step may be done after hydrogen firing. One or more steps may be inserted in between or substituted for each of the foregoing steps 22-26 without departing from the scope of this disclosure.

EXAMPLE 1

A bevel of 45 degrees ×0.016" was ground onto the cutting edge of the cutters. The cutters were tested on a vertical turret lathe (VTL) in testing methodology. Specifically, the cutter was tested such that the depth of cut was between 0.015" and 0.019" under a continuous flood of cooling fluid. The table was rotated at a variable speed such that the cutter machined a constant amount at 400 linear feet per minute. The cutter was in-fed into the rock at a constant rate of 0.160" per revolution of the table. The cutter was mounted into a fixture at an incline rake angle of −15 degrees and a side rake angle of zero degrees. The rock used in the test was a member of the granite family of rocks. Cutters produced with and without high temperature static air treatment were tested in a high abrasion test, and the wear of each cutter was measured at predetermined intervals, including the final state at the test conclusion. The treated cutters contained static air heat treated feed having weight loss between 19 wt % and 22 wt %. The treated and untreated cutters were processed under identical conditions of cutter preparation, HPHT processing, and dimensional finishing. The amount of rock removed in each test was kept constant, and the amount of cutter wear was determined by microscopic examination and volumetric calculation. The final states of cutter wear for both treated and untreated conditions were plotted in FIG. 7.

Figure 7:
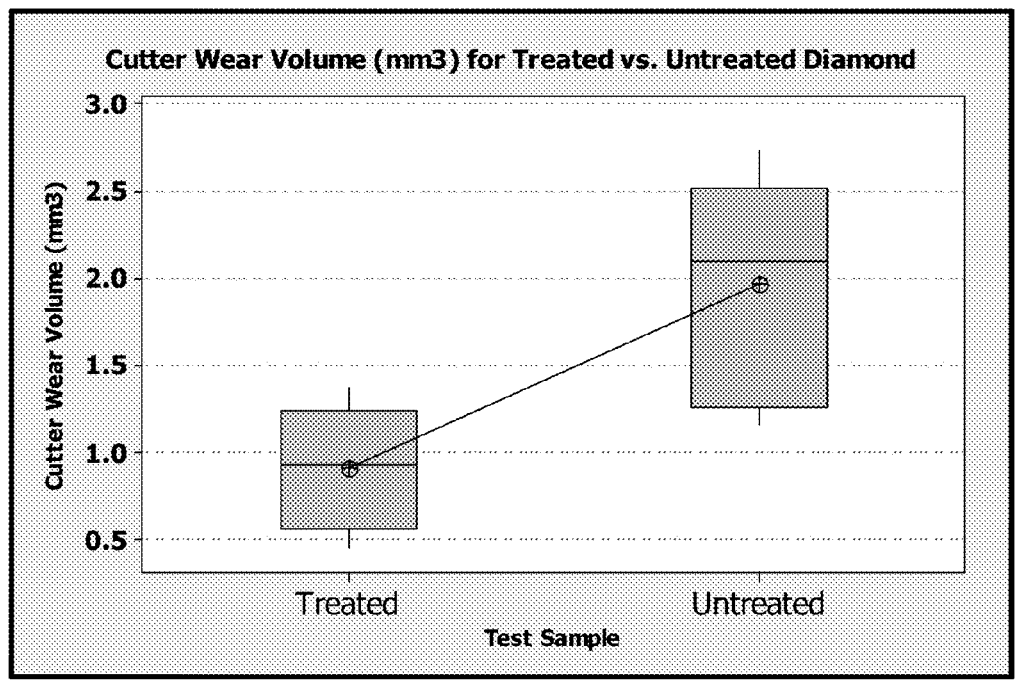
FIG. 7 is a graph showing the relative improvement in wear resistance against granite rock of cutters made from diamond particles treated by static air heated to about 850° C. for about 180 minutes, resulting in about 20% weight loss of the diamond particle mass prior to HPHT sintering.

FIG. 7 shows the results of VTL testing for six cutters each made from treated or untreated diamond particles. The amount of cutter wear for the treated feed was about half the cutter wear for untreated feed on average. The static air heat treatment of the diamond particles improved the cutter wear resistance by 50% compared to the untreated diamond particles.

EXAMPLE 2

A bevel of 45 degrees was ground onto the cutting edge of the cutters. The cutters were tested on a vertical turret lathe (VTL) in testing methodology. Specifically, the cutter was tested such that the depth of cut is between 0.010" and 0.030" in one example, between 0.015" and 0.017" in another example, under a continuous flood of cooling fluid. The table may be rotated at a variable speed such that the cutter machined a constant amount of linear feet per minute. The surface feet per minute were between 200 and 600 in one example, between 350 and 425 feet/minute in another example. The cutter was cross-fed into the rock at a constant rate between 0.100" and 0.200" per revolution of the table. The cutter was mounted into a fixture at an incline, with a rake angle between −5 and −20 degrees in one embodiment, between −12 and −16 degrees in another embodiment. The rock used in the test was a member of the granite family of rocks.

The depth of cut was typically 0.005" to 0.020" in one embodiment, between 0.008" and 0.011" in another embodiment. The table rotated at a constant speed, between 20 and 80 RPM in one embodiment, between 60 and 80 RPM in another embodiment. The cross feed rate was held constant between 0.150" and 0.500" per revolution of the table in one embodiment, between 0.250" and 0.400" in another embodiment.

The constant table speed and increased cross feed rate resulted in a variable rate of surface feet of rock machined per minute throughout a pass across the rock, subjecting a cutter to a complex thermal cycle, which imparted a high thermal load on cutters at the beginning of each pass, and gradually decreased as the cutter moved towards the center of the table.

Cutters produced with and without high temperature (HT) of flowing air treatment were tested in a high thermal abrasion test, and the wear of the cutter was measured at predetermined intervals. The cutters containing feed having weight loss of 20 wt % caused by the heat treatment was selected for VTL tests. The performance data curves were plotted in the FIG. 8.

Figure 8:
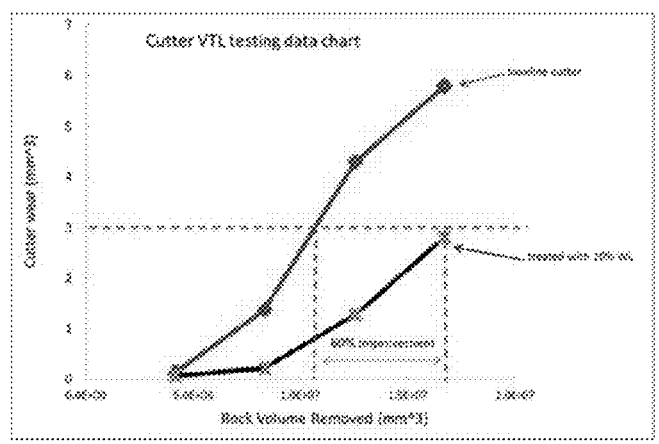
FIG. 8 is a graph showing the relative improvement in wear resistance against granite rock of cutters made from diamond particles treated by flow air heated to about 700° C. for about 60 minutes, resulting in about 20% weight loss of the diamond particle mass prior to HPHT sintering

FIG. 8 shows the cutter wear as a function of the volume of rock removed from the lathe by the cutter. The test feeds with a weight loss of 20 wt % contributed to a VTL performance that highly differentiated from that of the untreated feed. As seen from the plot, it could remove 50 % more rock volume to reach a cutter wear of 3 mm$^3$.

While reference has been made to specific embodiments, it is apparent that other embodiments and variations can be devised by others skilled in the art without departing from their spirit and scope. The appended claims are intended to be construed to include all such embodiments and equivalent variations.

The invention claimed is:

1. A method of making a polycrystalline superabrasive compact, comprising:
    treating a plurality of milled diamond particles in a pre-determined temperature at a pre-set atmosphere in such that diamond particles form nano-scale or sub-micron surface texture;
    providing a substrate positioned proximate to the plurality of treated diamond particles; and
    subjecting the substrate and the plurality of treated diamond particles to conditions of elevated temperature and pressure suitable for producing the polycrystalline superabrasive compact in which a solvent catalyst is melted and swept through the plurality of treated diamond particles to promote diamond-to-diamond bonding between the plurality of treated diamond particles.

2. The method of the claim 1, wherein the substrate is cemented tungsten carbide.

3. The method of the claim 1, wherein the pre-set atmosphere comprises hydrogen.

4. The method of the claim 1, wherein the pre-determined temperature is from about 550° C. to about 700° C.

5. The method of the claim 1, wherein the pre-set atmosphere is flowing air or flowing oxygen.

6. The method of the claim 1, wherein the pre-determined temperature is from about 750° C. to about 900° C.

7. The method of the claim 6, wherein the pre-set atmosphere is non-flowing or static air.

8. The method of the claim 5, wherein the elevated temperature and pressure are from about 1400° C. to about 2500° C. and about 10 to about 80 Kbar, respectively.

9. The method of claim 5, wherein the plurality of diamond particles are treated at the pre-determined temperature and the pre-set atmosphere such that the diamond particles undergo a weight loss from about 2% to 20% weight.

10. The method of claim 7, wherein the plurality of diamond particles are treated at the pre-determined temperature and the pre-set atmosphere such that the diamond particles undergo a weight loss from about 10% to 30% weight.

11. The method of claim 1, wherein the plurality of diamond particles are treated at the pre-determined temperature and the pre-set atmosphere such that crystal lattice defects of the diamond particles are removed.

12. The method of claim 11, wherein the crystal lattice defects are selected from the group consisting of as-grown inclusions, impurities, and dislocations.

13. The method of claim 1, wherein the plurality of diamond particles are treated at the pre-determined temperature and the pre-set atmosphere such that sharp corners of the milled diamond particles are at least partially rounded.

14. The method of claim 1, wherein the treatment of the plurality of milled diamond particles reduces the friction of the diamond particles.

15. The method of claim 1, wherein the treatment of the plurality of milled diamond particles modifies the surface energy of the milled diamond particles and increases inter-diamond sintering activity during conditions of elevated temperature and pressure in which the polycrystalline superabrasive compact is produced.

16. The method of claim 1, wherein the nano-scale or sub-micron surface texture is dissolved from the diamond particles by the molten solvent catalyst during conditions of elevated temperature and pressure.

* * * * *